United States Patent
Mazzucco et al.

(10) Patent No.: US 8,338,548 B2
(45) Date of Patent: Dec. 25, 2012

(54) PROCESS FOR THE GAS-PHASE POLYMERIZATION OF OLEFINS

(75) Inventors: Antonio Mazzucco, Ferrara (IT); Tiziana Caputo, Ferrara (IT); Riccardo Rinaldi, Mantova (IT)

(73) Assignee: Basell Poliolefine Italia s.r.l., Milan (IT)

( * ) Notice: Subject to any disclaimer, the term of this patent is extended or adjusted under 35 U.S.C. 154(b) by 0 days.

(21) Appl. No.: 13/394,026

(22) PCT Filed: Aug. 27, 2010

(86) PCT No.: PCT/EP2010/062574
§ 371 (c)(1),
(2), (4) Date: Mar. 2, 2012

(87) PCT Pub. No.: WO2011/029735
PCT Pub. Date: Mar. 17, 2011

(65) Prior Publication Data
US 2012/0172549 A1 Jul. 5, 2012

Related U.S. Application Data

(60) Provisional application No. 61/276,978, filed on Sep. 18, 2009.

(30) Foreign Application Priority Data

Sep. 11, 2009 (EP) .................................. 09170088

(51) Int. Cl.
*C08F 2/34* (2006.01)
*C08F 210/06* (2006.01)

(52) U.S. Cl. .............................. 526/74; 526/65; 526/901

(58) Field of Classification Search .................... 526/65, 526/74, 901
See application file for complete search history.

(56) References Cited

U.S. PATENT DOCUMENTS

| | | | |
|---|---|---|---|
| 4,739,015 A | 4/1988 | Toyota et al. | |
| 4,803,251 A | 2/1989 | Goode et al. | |
| 6,111,034 A * | 8/2000 | Goode et al. | 526/59 |
| 2003/0114608 A1 | 6/2003 | Tharappel et al. | |

FOREIGN PATENT DOCUMENTS

| | | |
|---|---|---|
| EP | 359444 | 3/1990 |
| EP | 0560035 | 9/1993 |
| EP | 782587 | 7/1997 |
| WO | WO-97/04015 | 2/1997 |
| WO | WO-0002929 | 1/2000 |
| WO | WO-2005019280 | 3/2005 |
| WO | WO-2006120187 | 11/2006 |

OTHER PUBLICATIONS

Geldart, D., "Gas Fluidisation Technology", J. Dily & sons Ltd 1986, 155.

* cited by examiner

*Primary Examiner* — Fred M Teskin
(74) *Attorney, Agent, or Firm* — Dilworth IP LLC

(57) ABSTRACT

A process for the gas-phase polymerization of one or more alpha-olefins in the presence of a polymerization catalyst, the process comprising:
at least a polymerization step wherein the polymer particles flow downward in densified form under the action of gravity so as to form a densified polymer bed;
metering an anti-fouling agent in said polymerization step by means of at least N feeding lines placed at different heights of said densified polymer bed, N being the integer number satisfying the equation $N \geq (1+0.08 \cdot H)$, where H is the height (expressed in meters) of the polymer bed.

11 Claims, 1 Drawing Sheet

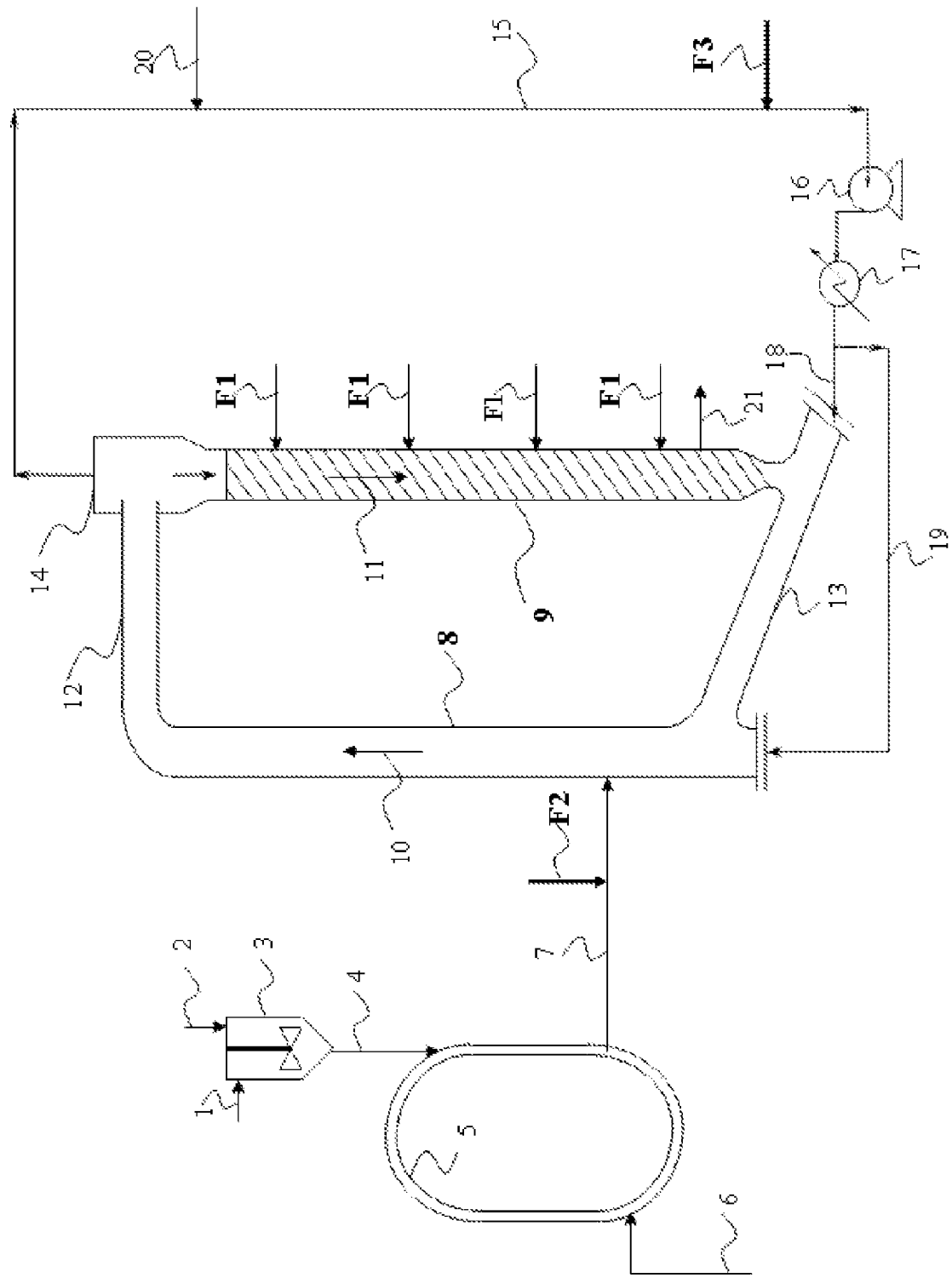

PROCESS FOR THE GAS-PHASE POLYMERIZATION OF OLEFINS

This application is the U.S. national phase of International Application PCT/EP2010/062574, filed Aug. 27, 2010, claiming priority to European Application 09170088.0 filed Sep. 11, 2009 and the benefit under 35 U.S.C. 119(e) of U.S. Provisional Application No. 61/276,978, filed Sep. 18, 2009; the disclosures of International Application PCT/EP2010/062574, European Application 09170088.0 and U.S. Provisional Application No. 61/276,978, each as filed, are incorporated herein by reference.

The present invention relates to a gas-phase polymerization process for the olefin polymerization comprising at least a polymerization step, where the polymer particles flow downward in a packed mode so as to form a densified polymer bed.

In particular, the present invention is addressed to improve the operability of a gas-phase polymerization reactor comprising two interconnected polymerization zones by means of a selective arrangement of the feed system of an antistatic agent to the polymerization reactor. It is known that a relevant problem to be overcome in a gas-phase polymerization process is the formation of polymer agglomerates, which can build up in various places, such as the polymerization reactor and the lines for recycling the gaseous stream. When polymer agglomerates form within the polymerization reactor there can be many adverse effects. For example, the agglomerates can disrupt the removal of polymer from the polymerization reactor by plugging the polymer discharge valves. Further, if the agglomerates fall and cover part of the fluidization grid a loss of fluidization efficiency may occur. This can result in the formation of larger agglomerates which can lead to the shutdown of the reactor.

It has been found that agglomerates may be also formed as a result of the presence of very fine polymer particles in the polymerization medium. These fine particles may be present as a result of introducing fine catalyst particles or breakage of the catalyst within the polymerization medium. These fine particles are believed to deposit onto and electrostatically adhere to the inner walls of the polymerization reactor and the associated equipment for recycling the gaseous stream such as, for example, the heat exchanger. If the fine particles remain active, in absence of heat removal, then the particles will grow in size resulting in the formation of agglomerates, also caused by the partial melting of the polymer itself. These agglomerates when formed within the polymerization reactor tend to be in the form of sheets. Agglomerates can also partially plug the heat exchanger designed to remove the heat of polymerization reaction.

Several solutions have been proposed to resolve the problem of formation of agglomerates during a gas-phase polymerization process. These solutions include the deactivation of the fine polymer particles, control of the catalyst activity and the reduction of the electrostatic charge.

EP 359444 describes the introduction into the polymerization reactor of small amounts of an activity retarder in order to keep substantially constant either the polymerization rate or the content of transition metal in the polymer produced. The process is said to produce a polymer without forming agglomerates.

U.S. Pat. No. 4,739,015 describes the use of gaseous oxygen containing compounds or liquid or solid active-hydrogen containing compounds to prevent the adhesion of the polymer to the inner wall of the polymerization apparatus.

U.S. Pat. No. 4,803,251 describes a process for reducing the polymer sheeting utilizing a group of chemical additives, which generate both positive and negative charges in the reactor, and which are fed to the reactor in an amount of a few parts per million (ppm) per part of the monomer in order to prevent the formation of undesired positive or negative charges.

EP 560035 discloses a polymerization process in which an anti-fouling compound is used to eliminate or reduce the build-up of polymer particles on the walls of the reactors, or the formation of agglomerates of polymer particles, which may cause the fouling of pipes or other plant components. This anti-fouling compound is preferably selected from alkydiethanolamines, which may be fed at any stage of the gas-phase polymerization process in an amount greater than 100 ppm by weight with respect to the produced (co)polymer. Said anti-fouling compound is capable, when used in a standard polymerization test of ethylene and polypropylene mixture, to selectively inhibit the polymerization on polymer particles smaller than 850 µm, the latter being responsible for fouling problems and polymer sheeting. Other processes for reducing the electrostatic voltage include: (1) installation of grounding devices in the fluidized bed; (2) ionization of gas or particles by electrical discharge to generate ions, which neutralize electrostatic charges onto the particles; (3) the use of radioactive sources to produce radiation capable of generating ions which neutralize electrostatic charges onto the particles.

A novel gas-phase process for the olefin polymerization, which represents a gas-phase technology alternative to the fluidized bed reactor technology, is disclosed in the Applicant's earlier EP-B-782587 and EP-B-1012195. The polymerization process is carried out in a gas-phase reactor having interconnected polymerization zones, where the growing polymer particles flow through a first polymerization zone (riser) under fast fluidization or transport conditions, leave said riser and enter a second polymerization zone (downcomer) through which they flow in a densified form under the action of gravity, leave said downcomer and are reintroduced into the riser, thus establishing a circulation of polymer between the two polymerization zones.

Also the particular gas-phase technology described in EP-B-1012195 may suffer from the typical drawbacks correlated with the formation of polymer agglomerates, due to the presence of electrostatic charges within the polymerization apparatus. It has been observed tendency to formation of polymer agglomerates, especially inside the second polymerization zone (downcomer). In fact, along the downcomer the polymer particles flow downward in a densified form in packed mode and this condition favors the formation of agglomerates, being more difficult to remove the polymerization heat due to the limited volume of gaseous phase. The polymer agglomerates can quickly plug the polymer discharge equipment, placed at the bottom part of the downcomer.

There is therefore the need to find the best operative conditions for feeding an antistatic compound to a gas-phase polymerization process comprising polymer particles flowing downward along the reactor in a densified form, so as to optimize the effect of neutralizing the electrostatic charges in this particular type of gas-phase polymerization reactor. The Applicant has surprisingly found that considerable differences in term of reactor fouling are achieved when suitably modifying the arrangement of the feed points of an antistatic compound in this polymerization process.

It is therefore an object of the present invention a process for the gas-phase polymerization of one or more alpha-olefins in the presence of a polymerization catalyst, the process comprising:

at least a polymerization step wherein the polymer particles flow downward in densified form under the action of gravity so as to form a densified polymer bed, metering an anti-fouling agent in said polymerization step by means of at least N feeding lines placed at different heights of said densified polymer bed, N being the integer number satisfying the equation N≧(1+0.08·H), where H is the height (expressed in meters) of the polymer bed.

The process of the present invention applies advantageously to all the gas-phase polymerization processes in which the growing polymer particles flow downward into the reactor in a densified form, so that high values of density of the solid inside the reactor are reached, these values approaching the bulk density of the polymer.

The "poured bulk density" of a polymer is a parameter well known to the person skilled in the art: it can be measured according to ASTM D1895/69. The density of solid inside the reactor is defined as mass of polymer per volume of reactor occupied by the polymer.

Specifically, throughout the present specification the term "densified form" of the polymer means that the ratio between the mass of polymer and the reactor volume is higher than 80% of the "poured bulk density" of the obtained polymer. Thus, for instance, in case of a polymer bulk density equal to 420 Kg/m$^3$, a "densified form" of the polymer implies that the polymer mass/reactor volume ratio is of at least 336 kg/m$^3$.

The operating parameters, such as temperature and pressure, are those usually adjusted in a gas-phase catalytic polymerization process: the temperature is generally comprised between 60° C. and 120° C., while the pressure can range from 5 to 50 bar.

The terms "anti-fouling agent" or "antistatic agent" are used in the present description to include the following compounds:

antistatic substances capable of neutralizing the electrostatic charges of the polymer particles;

cocatalyst deactivators that partially deactivate the aluminium alkyl co-catalyst, provided that they do not substantially inhibit the overall polymerization activity.

Consequently, an "anti-fouling agent" or "antistatic agent" according to the invention is any substance that is capable to prevent, eliminate or substantially reduce the formation of build-up of polymer on any equipment of the polymerization plant, including sheeting of reactor walls, or deposits of polymer agglomerates onto any line of the polymerization plant, including the gas recycle line.

According to present invention an anti-fouling agent is metered into the polymerization process by means of a specific arrangement, so as to maximise the anti-static effect of neutralizing the electrostatic charges on the polymer particles flowing downward in a densified form along the polymerization reactor. The feed of anti-fouling agent is arranged along the height of the densified polymer bed by means of at least N feeding lines, N being the integer number satisfying the equation N≧(1+0.08·H), where H is the height (expressed in meters) of the polymer bed inside the reactor.

Throughout the present specification the "height H of the reactor" is referred as the height of the densified polymer bed inside the reactor. By way of an example, if said height H is equal to 15 m, the above equation becomes "N≧(1+0.08·15) ≧2.2", thus meaning that at least 3 feeding lines should be arranged along the height of the polymer bed in order to distribute homogeneously the anti-fouling agent. Said feeding lines are preferably located at a similar distance each other along the axes of the reactor. This set-up allows the achievement of a substantially uniform distribution of the antistatic agent inside the packed polymer bed flowing downward along the polymerization reactor, thus reducing the regions of the reactor not influenced by the antistatic action.

According a preferred embodiment of the invention, the feed of anti-fouling agent is distributed along the height of the densified polymer bed by means of at least N feeding lines, N being the integer number satisfying the equation N≧(1+0.1·H), where H is the height (expressed in meters) of the polymer bed inside the reactor.

The anti-fouling agent of present invention may be added to the polymerization process neat or diluted in a hydrocarbon solvent, which is useful to improve its dispersion. Suitable hydrocarbon solvents are isopentane, isohexane, n-hexane, cyclohexane, heptane. When a solvent is employed, the amount of antifouling agent in the solution (antifoulant+solvent) may range from 2% to 60% by wt, preferably from 4% to 40% by wt.

The antifouling agent is generally added to the polymerization process in a total amount ranging from 5 to 250 ppm weight, based on the weight of polyolefin being produced. Use of lower amounts will be less effective in preventing the polymer buildup, while use of larger amounts will adversely affect the operation of the reactor, more specifically the catalyst activity. Preferred amounts of said antifouling agent are within the range from 10 to 100 ppm weight, based on the weight of polyolefin being produced.

In particular, the process of the present invention can be advantageously applied to the gas-phase polymerization process disclosed in EP 782587 and EP 1012195, where the polymerization of one or more olefins is carried out in two interconnected polymerization zones: in fact, the polymerization conditions inside the second polymerization zone are such that the polymer particles flow downward in a "densified form" under the action of gravity. Therefore, according to a preferred embodiment of present invention, one or more alpha-olefins are polymerized in a gas-phase reactor having two interconnected polymerization zones, the first polymerization zone, denominated the riser, comprising polymer particles flowing upward under fast fluidization or transport conditions, the second polymerization zone, denominated the downcomer, comprising polymer particles flowing downward in densified form under the action of gravity so as to form a 7 densified polymer bed.

Fast fluidization conditions inside the riser are established by feeding a gas mixture comprising one or more alpha-olefins at a velocity higher than the transport velocity of the polymer particles. The velocity of said gas mixture is generally comprised between 0.5 and 15 m/s, preferably between 0.8 and 5 m/s. The terms "transport velocity" and "fast fluidization conditions" are well known in the art; for a definition thereof, see, for example, "D. Geldart, Gas Fluidisation Technology, page 155 et seq., J. Wiley & Sons Ltd., 1986".

In the downcomer the polymer particles flow under the action of gravity in a densified form, so that the density of the solid inside this polymerization zone approaches the bulk density of the polymer.

When the process of present invention is applied to the above gas-phase reactor, the feed of anti-fouling agent is arranged along the height of the downcomer by means of at least N feeding lines, N being the integer number satisfying the equation N≧(1+0.08·H), where H is the height (expressed in meters) of the densified polymer bed inside the downcomer. The "height H of the downcomer" is also intended as the height of the packed polymer inside the downcomer.

It has been observed that when the feed of anti-fouling agent along the downcomer is not concentrated in a single feed line, but it is distributed along the downcomer according to the teaching of present invention, a high level of incorporation of the antifouling agent on the densified polymer bed is achieved, thus reducing the formation of polymer sheeting and polymer agglomerates along the entire downcomer.

On the contrary, when the feed lines of the anti-fouling agent into the downcomer are lower than the above identified number N, satisfactory results in term of fouling prevention are not achieved. The comparative example of present Application shows that, when using an antistatic amount ranging from 5 to 250 ppm based on the weight of produced polyolefin, and a number of feed lines lower than N, a correct and reliable working of the second polymerization zone is seriously prejudiced, due to formation of polymer agglomerates inside the downcomer. Said polymer agglomerates are finally capable of causing the plugging of the polymer discharge line arranged at the bottom part of the downcomer.

Other additional feed lines of the anti-fouling agent may be arranged in the polymerization reactor having two interconnected polymerization zones. In particular, said additional feeds of anti-fouling agent may be arranged on the line feeding the catalyst system to the riser and/or along the line continuously recycling the gas monomers to the polymerization reactor. According to a preferred embodiment of the invention, the anti-fouling agent is metered into the gas-phase reactor with interconnected polymerization zones by means of three separate feeds:
 a first feed F1 distributed along the height of the downcomer by means of at least N feeding lines, N being said integer number satisfying the above equation $N \geq (1+0.08 \cdot H)$;
 a second feed line F2 arranged on the line feeding the prepolymer to said riser;
 a third feed line F3 arranged along the gas recycle line, preferably upstream the recycle compressor.

The total amount of antifouling agent added to the above polymerization reactor ranges from 20 to 500 ppm weight, based on the weight of polyolefin being produced. Preferred amounts of said antifouling agent are within the range from 50 to 250 ppm weight, based on the weight of polyolefin being produced. According to this preferred embodiment, the amount of antifouling compound is distributed in this way: the first feed $F_1$ comprises from 30 to 60% by weight of the total amount of anti-fouling agent, the second feed $F_2$ comprises from 5 to 20% by weight of the total amount of anti-fouling agent, and the third feed $F_3$ comprises from 30 to 60% by weight of the total amount of anti-fouling agent.

The process of the present invention will now be described in detail with reference to the enclosed figure, which has to be considered illustrative and not limitative of the scope of the invention.

BRIEF DESCRIPTION OF THE DRAWINGS

FIG. 1 is a diagrammatic representation of the process of the invention when applied to the gas-phase polymerization apparatus having two interconnected polymerization zones, as described in EP-B-782587 and EP-B-1012 195.

According to the embodiment shown in FIG. 1 a Ziegler-Natta polymerization catalyst is subjected to prepolymerization in a loop reactor before its introduction into the polymerization reactor having two interconnected polymerization zones.

A solid catalyst component 1, a cocatalyst 2 and optionally a donor compound, are fed to a pre-activation vessel 3 together with a diluent, such as propane. The pre-activated catalyst is fed via line 4 to a loop prepolymerization reactor 5, where an α-olefin is fed via line 6. A slurry containing the particles of prepolymer is discharged from the loop reactor 5 and is fed via line 7 to the riser 8 of the gas-phase reactor having two interconnected polymerization zones.

The gas-phase reactor of FIG. 1 comprises two polymerization zones having a cylindrical shape: the riser 8, where the polymer flows upward under fast fluidization conditions along the direction of arrow 10, and the downcomer 9 where the polymer flows downward under the action of gravity along the direction of arrow 11. By way of an example, the downcomer 9 has a height H=20 m and a diameter=1.1 m.

The riser 8 and the downcomer 9 are appropriately interconnected by the interconnection bends 12 and 13. After flowing through the riser 8, the polymer particles and the gaseous mixture leave the riser 8 and are conveyed to a solid/gas separation zone 14. This solid/gas separation can be effected by using conventional separation means such as, for example, a centrifugal separator (cyclone). From the separation zone 14 the polymer enters the downcomer 9.

The gaseous mixture leaving the separation zone 14 is recycled to the riser 8 by means of a recycle line 15, equipped with a compressor 16 and a heat exchanger 17. Downstream the heat exchanger 17 the recycle line splits into two separated streams: the first one (line 18) conveys the recycle gas into the interconnection bend 13, while the second one (line 19) conveys the recycle gas to the bottom of the riser 8, so as to establish fast fluidization conditions therein.

A gaseous mixture comprising the make-up monomers, hydrogen and propane, as an inert diluent, is continuously fed to the polymerization process through one or more lines 20, suitably placed at any point of the gas recycle line 15, according to the knowledge of the skilled person in art. The produced polyolefin is continuously discharged from the bottom portion of downcomer 9 via the discharge line 21.

According to the teaching of present invention, the first feed F1 of anti-fouling agent is distributed along the height of the downcomer by means of at least N feeding lines, N being the integer number satisfying the equation $N \geq (1+0.08 \cdot H)$. In this particular case where H=20 m, the feed lines F1 metering the anti-fouling agent into the downcomer should be at least three, as shown by FIG. 1.

Moreover, according to the above described preferred embodiment of the invention comprising three different feeds of the anti-fouling agent, another portion of the anti-fouling agent is metered into the polymerization apparatus by means of feed line F2, which is arranged on the line 7 introducing the pre-polymerized catalyst into the riser 8. Finally, a third portion of the anti-fouling agent is metered in the polymerization process by means of feed line F3, which is arranged on the gas recycle line 15, upstream the compressor 16 as shown in FIG. 1.

Depending on the olefin (co)polymer to be produced, the polymerization reactor can be operated by properly adjusting the polymerization conditions and the monomers concentration in the riser and in the downcomer, so as to produce a wide variety of bimodal homopolymers and random copolymers. To this purpose, the gas mixture entraining the polymer particles and coming from the riser can be partially or totally prevented from entering the downcomer, so as to polymerize two different monomers compositions in the riser and the downcomer. This effect may be achieved by feeding a gaseous and/or a liquid barrier stream through a line placed in the upper portion of the downcomer: said barrier stream should have a suitable composition, different from the gas composition present inside the riser. The flow rate of said barrier stream can be adjusted, so that an upward flow of gas countercurrent to the flow of the polymer particles is generated, particularly at the top of the downcomer, thus acting as a barrier to the gas mixture coming from the riser. For further details regarding this barrier effect at the top of the downcomer, reference is made to the disclosure of EP-B-1012195.

In general, all the anti-fouling agents conventionally known in the art, which are able to prevent, eliminate or substantially reduce the formation of build-up of polymer on any part of the polymerization plant, may be used in the present invention. An overview of antistatic agents suitable for polymerization processes is also given in EP 107127.

The anti-fouling agent can be selected from one or more of the following classes:
(1) alkyldiethanolammines of formula $R-N(CH_2CH_2OH)_2$ wherein R is an alkyl radical comprised between 10 and 20 carbon atoms, preferably between 12 and 18 carbon atoms;
(2) Polyepoxidate oils, such as epoxidate linseed oil and epoxidate soya oil;
(3) Polyalcohols having from 4 to 8 carbon atoms;
(4) Hydroxyesters with at least two free hydroxyl groups, obtained from carboxylic acids with from 8 to 22 carbon atoms and from polyalcohols;
(5) Amides of formula $R-CONR'R''$, wherein R, R', and R'' may be the same or different and is a saturated or unsaturated hydrocarbon radical having 1 to 22 carbon atoms;
(6) Fatty acid soaps represented by the general formula $R-COOM$, wherein R is a saturated or unsaturated hydrocarbon radical having 12 to 22 carbon atoms, and M is an alkali or alkaline earth metal;
(7) Salts of sulfuric acid esters of higher alcohols represented by the general formula $ROSO_3M$, wherein R is a saturated or unsaturated hydrocarbon radical having 12 to 22 carbon atoms, and M is an alkali or alkaline earth metal;
(8) Salts of sulfuric acid esters of higher secondary alcohols represented by the general formula

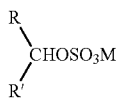

wherein R and R' may be the same or different and are selected from saturated or unsaturated hydrocarbon radical having 12 to 22 carbon atoms, M is an alkali or alkaline earth metal;
(9) Compounds represented by the general formula

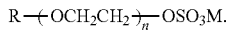

wherein R, M and n are the same as above defined;
(10) Salts of (higher alkyl) sulfonic acids represented by the general formula $RSO_3M$ wherein R, M and n are the same as above defined;
(11) Salts of alkylarylsulfonic acids;
(12) Alkali or alkaline earth metal salts of dialkylsulfosuccinic acids;
(13) Alkali or alkaline earth metal salts of partial esters of higher alcohols with phosphoric acid;
(14) Salts of primary amines represented by the general formula

wherein R is a saturated or unsaturated hydrocarbon radical; A is chlorine, bromine;

(15) Compounds of the alkylaminesulfonic acid type represented by the general formula

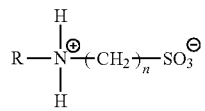

(16) Compounds represented by the general formula

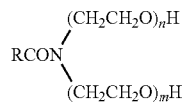

wherein R is a saturated or unsaturated hydrocarbon radical having 4 to 22 carbon atoms; n and m, which may be the same or different, are numbers of from 1 to 10;

Preferred anti-fouling agents used in the process of the present invention are the compounds belonging to the above classes (1), (2), (3), (4) and (5).

Among the compounds of class (1) particularly preferred anti-fouling compounds are alkydiethanolamines, wherein the alkyl group has from 10 to 18 carbon atoms. A preferred compound is a commercial product sold under the trademark ATMER163® (mixture of alkyldiethanolammines of formula $R-N(CH_2CH_2OH)_2$ where R is an alkyl radical $C_{12}-C_{18}$). Among the compounds of class (2) particularly preferred anti-fouling compound is Edenol D81®. Among the compounds of class (4) particularly preferred is glycerol monostearate (GMS).

The polymerization process of the invention allows the preparation of a large number of polyolefins. Examples of polyolefins that can be obtained are:
high-density polyethylene (HDPE having relative densities higher than 0.940) including ethylene homopolymers and ethylene copolymers with α-olefins having 3 to 12 carbon atoms;
linear polyethylene of low density (LLDPE having relative densities lower than 0.940) and of very low density and ultra low density (VLDPE and ULDPE having relative densities lower than 0.920 down to 0.880) consisting of ethylene copolymers with one or more α-olefins having 3 to 12 carbon atoms;
elastomeric terpolymers of ethylene and propylene with minor proportions of diene or elastomeric copolymers of ethylene and propylene with a content of units derived from ethylene of between about 30 and 70% by weight;
isotactic polypropylene and crystalline copolymers of propylene and ethylene and/or other α-olefins having a content of units derived from propylene of more than 85% by weight;
isotactic copolymers of propylene and α-olefins, such as 1-butene, with an α-olefin content of up to 30% by weight;
impact-resistant propylene polymers obtained by sequential polymerisation of propylene and mixtures of propylene with ethylene containing up to 30% by weight of ethylene;
atactic polypropylene and amorphous copolymers of propylene and ethylene and/or other α-olefins containing more than 70% by weight of units derived from propylene.

The polymerization process of the present invention can be carried out upstream or downstream other conventional polymerization technologies (either in a liquid-phase or a gas-phase) to give rise a sequential multistage polymerization process. For instance, a fluidised bed reactor can be used to prepare a first polymer component, which is successively fed to the gas-phase reactor of FIG. 1 to prepare a second and a third polymer component. Accordingly, an ethylene polymer endowed with a tri-modal molecular weight distribution can be obtained, as well as a polypropylene blend comprising three components having a different content in ethylene.

The gas-phase polymerization process herewith described is not restricted to the use of any particular family of polymerization catalysts. The invention is useful in any exothermic polymerization reaction employing any catalyst, whether it is supported or unsupported, and regardless of whether it is in pre-polymerized form.

The polymerization reaction can be carried out in the presence of highly active catalytic systems, such as Ziegler-Natta catalysts, single site catalysts, chromium-based catalysts, vanadium-based catalysts.

A Ziegler-Natta catalyst system comprises the catalysts obtained by the reaction of a transition metal compound of groups 4 to 10 of the Periodic Table of Elements (new notation) with an organometallic compound of group 1, 2, or 13 of the Periodic Table of element.

In particular, the transition metal compound can be selected among compounds of Ti, V, Zr, Cr, and Hf. Preferred compounds are those of formula $Ti(OR)_nX_{y-n}$ in which n is comprised between 0 and y; y is the valence of titanium; X is halogen and R is a hydrocarbon group having 1-10 carbon atoms or a COR group. Among them, particularly preferred are titanium compounds having at least one Ti-halogen bond such as titanium tetrahalides or halogenalcoholates. Preferred specific titanium compounds are $TiCl_3$, $TiCl_4$, $Ti(OBu)_4$, $Ti(OBu)Cl_3$, $Ti(OBu)_2Cl_2$, $Ti(OBu)_3Cl$.

Preferred organometallic compounds are the organo-Al compounds and in particular Al-alkyl compounds. The alkyl-Al compound is preferably chosen among the trialkyl aluminum compounds such as for example triethylaluminum, tri-isobutylaluminum, tri-n-butylaluminum, tri-n-hexylaluminum, tri-n-octylaluminum. It is also possible to use alkylaluminum halides, alkylaluminum hydrides or alkylaluminum sesquichlorides such as $AlEt_2Cl$ and $Al_2Et_3Cl_3$ optionally in mixture with said trialkyl aluminum compounds.

Particularly suitable high yield ZN catalysts are those wherein the titanium compound is supported on magnesium halide in active form which is preferably $MgCl_2$ in active form. Particularly for the preparation crystalline polymers of $CH_2CHR$ olefins, where R is a C1 C10 hydrocarbon group, internal electron donor compounds can be supported on the $MgCl_2$. Typically, they can be selected among esters, ethers, amines, and ketones. In particular, the use of compounds belonging to 1,3-diethers, cyclic ethers, phthalates, benzoates, acetates and succinates is preferred.

When it is desired to obtain a highly isotactic crystalline polypropylene, it is advisable to use, besides the electron-donor present in the solid catalytic component, an external electron-donor (ED) added to the aluminium alkyl co-catalyst component or to the polymerization reactor. These external electron donors can be selected among alcohols, glycols, esters, ketones, amines, amides, nitriles, alkoxysilanes and ethers. The electron donor compounds (ED) can be used alone or in mixture with each other. Preferably the ED compound is selected among aliphatic ethers, esters and alkoxysilanes. Preferred ethers are the C2-C20 aliphatic ethers and in particular the cyclic ethers preferably having 3-5 carbon atoms, such as tetrahydrofurane (THF), dioxane. Preferred esters are the alkyl esters of C1-C20 aliphatic carboxylic acids and in particular C1-C8 alkyl esters of aliphatic mono carboxylic acids such as ethylacetate, methyl formiate, ethylformiate, methylacetate, propylacetate, i-propylacetate, n-butylacetate, i-butylacetate. The preferred alkoxysilanes are of formula $R_a^1R_b^2Si(OR^3)_c$, where a and b are integer from 0 to 2, c is an integer from 1 to 3 and the sum (a+b+c) is 4; $R^1$, $R^2$, and $R^3$, are alkyl, cycloalkyl or aryl radicals with 1-18 carbon atoms. Particularly preferred are the silicon compounds in which a is 1, b is 1, c is 2, at least one of $R^1$ and $R^2$ is selected from branched alkyl, cycloalkyl or aryl groups with 3-10 carbon atoms and $R^3$ is a $C_1$-$C_{10}$ alkyl group, in particular methyl.

Other useful catalysts are the vanadium-based catalysts, which comprise the reaction product of a vanadium compound with an aluminum compound, optionally in the presence of a halogenated organic compound. Optionally the vanadium compound can be supported on an inorganic carrier, such as silica, alumina, magnesium chloride. Suitable vanadium compounds are $VCl_4$, $VCl_3$, $VOCl_3$, vanadium acetyl acetonate.

Other useful catalysts are those based on chromium compounds, such as chromium oxide on silica, also known as Phillips catalysts.

Other useful catalysts are single site catalysts, for instance metallocene-based catalyst systems which comprise:
at least a transition metal compound containing at least one π bond;
at least an alumoxane or a compound able to form an alkyl-metallocene cation; and
optionally an organo-aluminum compound.

A preferred class of metal compounds containing at least one n bond are metallocene compounds belonging to the following formula (I):

$$Cp(L)_qAMX_p \qquad (I)$$

wherein M is a transition metal belonging to group 4, 5 or to the lanthanide or actinide groups of the Periodic Table of the Elements; preferably M is zirconium, titanium or hafnium;
the substituents X, equal to or different from each other, are monoanionic sigma ligands selected from the group consisting of hydrogen, halogen, $R^6$, $OR^6$, $OCOR^6$, $SR^6$, $NR^6_2$ and $PR^6_2$, wherein $R^6$ is a hydrocarbon radical containing from 1 to 40 carbon atoms; preferably, the substituents X are selected from the group consisting of —Cl, —Br, -Me, -Et, -n-Bu, -sec-Bu, -Ph, -Bz, —$CH_2SiMe_3$, —OEt, —OPr, —OBu, —OBz and —$NMe_2$;
p is an integer equal to the oxidation state of the metal M minus 2;
n is 0 or 1; when n is 0 the bridge L is not present;
L is a divalent hydrocarbon moiety containing from 1 to 40 carbon atoms, optionally containing up to 5 silicon atoms, bridging Cp and A, preferably L is a divalent group $(ZR^7_2)_n$; Z being C, Si, and the $R^7$ groups, equal to or different from each other, being hydrogen or a hydrocarbon radical containing from 1 to 40 carbon atoms;
more preferably L is selected from $Si(CH_3)_2$, $SiPh_2$, $SiPhMe$, $SiMe(SiMe_3)$, $CH_2$, $(CH_2)_2$, $(CH_2)_3$ or $C(CH_3)_2$;
Cp is a substituted or unsubstituted cyclopentadienyl group, optionally condensed to one or more substituted or unsubstituted, saturated, unsaturated or aromatic rings;
A has the same meaning of Cp or it is a $NR^7$, —O, S, moiety wherein $R^7$ is a hydrocarbon radical containing from 1 to 40 carbon atoms;

Alumoxanes used as component b) are considered to be linear, branched or cyclic compounds containing at least one group of the type:

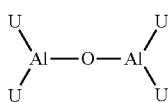

wherein the substituents U, same or different, are defined above.

In particular, alumoxanes of the formula:

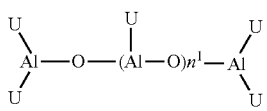

can be used in the case of linear compounds, wherein $n^1$ is 0 or an integer of from 1 to 40 and where the U substituents, same or different, are hydrogen atoms, halogen atoms, $C_1$-$C_{20}$-alkyl, $C_3$-$C_{20}$-cyclalkyl, $C_6$-$C_{20}$-aryl, $C_7$-$C_{20}$-alkylaryl or $C_7$-$C_{20}$-arylalkyl radicals, optionally containing silicon or germanium atoms, with the proviso that at least one U is different from halogen, and j ranges from 0 to 1, being also a non-integer number; or alumoxanes of the formula:

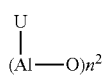

can be used in the case of cyclic compounds, wherein $n^2$ is an integer from 2 to 40 and the U substituents are defined as above.

The catalyst may suitably be employed in the form of a pre-polymer powder prepared beforehand during a pre-polymerization stage with the aid of a catalyst as described above. The pre-polymerization may be carried out by any suitable process, for example, polymerization in a liquid hydrocarbon diluent or in the gas phase using a batch process, a semi-continuous process or a continuous process.

The following examples will further illustrate the present invention without limiting its scope.

EXAMPLES

Characterization

Poured bulk density: measured according to ASTM D1895/69;
Melt Flow Index, condition L (MIL): determined according to ISO 1133 (230° C./5 Kg);
Ethylene content: determined by IR spectroscopy.
General Polymerization Conditions The polymerization is carried out in continuous in a plant comprising a precontacting section, where the various catalyst components are premixed, a prepolymerization section, and a gas-phase polymerization section carried out in a reactor having two interconnected polymerization zones, as described in connection with FIG. 1.

The polymerization reactor comprises two polymerization zones having a cylindrical shape: the riser 8 (height 34.0 m, diameter 1.8 m) and the downcomer 9 (height 26.5 m; diameter 1.1 m), interconnected by the sections 12 and 13. The height H of the densified polymer bed inside the downcomer 9 is of 22.5 m.

A Ziegler-Natta catalyst is used as the polymerization catalyst, comprising:

a titanium solid catalyst component prepared with the procedure described in EP 728 769, Example 5, lines 46 to 53;
triethylaluminium (TEAL) as a cocatalyst;
dicyclopentyldimethoxysilane as an external donor.

The molar ratio Al/Ti is 68, while the weight ratio TEAL/external donor is 4. The above catalyst components are pre-contacted at 15° C. for 10 minutes in a precontacting vessel.

The activated catalyst is fed to the prepolymerization section where propylene is polymerized in slurry. The propylene feed and the residence time are adjusted so as to obtain the desired prepolymerization yields, in terms of g of prepolymer per g of solid catalyst component.

After the prepolymerization, the obtained prepolymer is continuously introduced via line 7 into the gas-phase polymerisation reactor.

Example 1

Polypropylene is prepared by polymerizing propylene in the presence of hydrogen as a molecular weight regulator and propane as an inert diluent. In the riser and downcomer the following operative conditions are satisfied:

| | |
|---|---|
| temperature riser (° C.) | 75 |
| temperature downcomer (° C.) | 82.5 |
| pressure riser (barg) | 28 |
| pressure downcomer (barg) | 28 |

In both riser and downcomer the reaction gas has the following molar composition:

| | |
|---|---|
| propylene (% mol) | 90 |
| propane (% mol) | 9 |
| hydrogen (% mol) | 1 |

About 1000 ton/h of a gaseous stream containing propylene, propane and hydrogen flows upwards along the riser 8, where fast fluidization conditions are established: the polymerisation takes place forming polypropylene particles, which are conveyed through the interconnection bend 12 to the separation zone 14. From this zone 14 the polymer is mostly separated from the gas and enters the downcomer 9. About 50 ton/h of gas are entrapped with the descending flow of polymer in the downcomer 9, while a gas stream in an amount of about 950 ton/h is conveyed to the gas recycle line 15.

The density of solid (Kg of polymer per $m^3$ of reactor occupied by the polymer) inside the downcomer 9 is measured in order to evaluate if the polymer particles flow downward in a "densified" form along the downcomer 9: the measurement gives a value of about 410 Kg/$m^3$. At the same time, the poured bulk density of the obtained polypropylene particles is measured giving a value of 440 Kg/$m^3$. Thus, the density of solid in the downcomer is higher than 80% of the "poured bulk density" of the obtained polypropylene, so that a densified bed of polymer flows downward along the downcomer 9.

ATMER163® (mixture of alkyldiethanolammines of formula R—N(CH$_2$CH$_2$OH)$_2$ where R is an alkyl radical $C_{13}$-$C_{15}$) is used as antistatic agent in this example.

According to the teaching of present invention, a number of four feed lines F1 (as shown in FIG. 1) for feeding said antistatic compound are arranged along the height of the densified polymer bed: this arrangement satisfies the equation $N \geq (1+0.08 \cdot H)$, where $H=22.5$ m. Said feed lines F1 are placed at a mutual distance of about 5 m along the height of the downcomer 9.

Polypropylene is continuously discharged from the bottom of the downcomer via line 21 with a flow rate of 20 t/h (reactor productivity).

The total amount of ATMER163 fed to the downcomer 9 by means of the above feed lines F1 is equal to 1.0 kg/h, which is equivalent to 50 ppm weight based on the weight of polypropylene discharged from the reactor.

A second line F2 for dosing 0.13 Kg/h of ATMER163 is arranged on line 7 feeding the prepolymer to the riser 8 (as shown in FIG. 1).

A third line F3 for dosing 0.45 Kg/h of ATMER163 is arranged along the gas recycle line 15 upstream the compressor 16 (as shown in FIG. 1).

Accordingly, the total amount of ATMER163 introduced in the polymerization reactor is of 1.58 Kg/h, equivalent to 79 ppm weight based on the weight of polypropylene discharged from the downcomer 9.

The melt Index MIL of obtained polypropylene is measured to be 10.0 (g/10 min).

As a result, the feed of the above antistatic agent by means of feed lines F1, F2, and F3 allows a continuous discharge of polypropylene from the reactor, preventing any formation of polymer lumps in the gas-phase reactor. In particular, when the antifouling agent is distributed along the downcomer 9 by feed lines satisfying the equation $N \geq (1+0.08 \cdot H)$, a high level of its incorporation on the densified polymer is achieved, thus avoiding formation of polymer chunks along the entire downcomer 9.

Example 2

A propylene/ethylene copolymer is prepared by polymerizing propylene and ethylene in the presence of hydrogen as a molecular weight regulator and propane as an inert diluent. In the riser and downcomer the following operative conditions are satisfied:

| | |
|---|---|
| temperature riser (° C.) | 72 |
| temperature downcomer (° C.) | 84 |
| pressure riser (barg) | 28 |
| pressure downcomer (barg) | 28 |

In both riser and downcomer the reaction gas has the following molar composition:

| | |
|---|---|
| propylene (% mol) | 85.8 |
| ethylene (% mol) | 2.2 |
| propane (% mol) | 8.0 |
| hydrogen (% mol) | 4.0 |

About 1000 ton/h of a gaseous stream containing propylene, ethylene, propane and hydrogen flows upwards along the riser 8, where fast fluidization conditions are established. The polymer is mostly separated from the gas by the gas/solid separator 14. About 44 ton/h of gas are entrapped with the descending flow of polymer in the downcomer 9 while a gas stream in an amount of about 956 ton/h is conveyed to the recycle line 15.

The density of solid (Kg of polymer per $m^3$ of reactor occupied by the polymer) inside the downcomer 9 is measured in order to evaluate if the polymer particles flow downward in a "densified" form along the downcomer 9: the measurement gives a value of about 420 Kg/$m^3$. The poured bulk density of the obtained copolymer is measured giving a value of 450 Kg/$m^3$. Therefore, a flow of densified polymer flows downward along the downcomer.

ATMER163® (mixture of alkyldiethanolammines of formula R—N(CH$_2$CH$_2$OH)$_2$ where R is an alkyl radical $C_{13}$-$C_{15}$) is used as antistatic agent in this example.

Four feed lines F1 for feeding said antistatic compound are arranged along the height of the densified polymer bed. The ethylene/propylene copolymer is continuously discharged from the bottom of the downcomer via line 21 with a flow rate of 22 t/h (reactor productivity).

The total amount of ATMER163 fed to the downcomer 9 by means of the above feed lines F1 is equal to 0.27 kg/h, which is equivalent to 12 ppm weight based on the weight of copolymer discharged from the reactor.

A second line F2 for dosing 0.13 Kg/h of ATMER163 is arranged on line 7 feeding the prepolymer to the riser 8 (as shown in FIG. 1).

A third line F3 for dosing 2.64 Kg/h of ATMER163 is arranged along the gas recycle line 15 upstream the compressor 16 (as shown in FIG. 1).

Accordingly, the total amount of ATMER163 introduced in the polymerization reactor is of 3.04 Kg/h, equivalent to about 138 ppm weight based on the weight of copolymer discharged from the downcomer 9.

The obtained copolymer has a melt Index MIL of 10.0 (g/10 min) and an ethylene content of 3.0 wt %.

Also in this polymerization run a continuous discharge of copolymer from the reactor is observed and any formation of polymer lumps in the downcomer is prevented. In particular, a high level of incorporation of antistatic agent on the densified polymer is achieved, thus avoiding formation of polymer chunks along the entire downcomer 9.

Example 3

A propylene/ethylene copolymer is prepared by polymerizing propylene and ethylene in the presence of hydrogen as a molecular weight regulator and propane as an inert diluent.

In the riser and downcomer the same operative conditions of temperature, pressure, molar composition of Example 2 are selected.

About 1000 ton/h of a gaseous stream containing propylene, ethylene, propane and hydrogen flows upwards along the riser 8, where fast fluidization conditions are established. The polymer is mostly separated from the gas by the gas/solid separator 14. About 44 ton/h of gas are entrapped with the descending flow of polymer in the downcomer 9 while a gas stream in an amount of about 956 ton/h is conveyed to the recycle line 15.

The density of solid (Kg of polymer per $m^3$ of reactor occupied by the polymer) inside the downcomer 9 is measured in order to evaluate if the polymer particles flow downward in a "densified" form along the downcomer 9: the measurement gives a value of about 420 Kg/$m^3$.

The poured bulk density of the obtained copolymer is measured giving a value of 450 Kg/$m^3$. Therefore, a flow of densified polymer flows downward along the downcomer.

EDENOL D81® (epoxidized soybean oil) is used as antistatic agent in this example.

Four feed lines F1 for feeding said antistatic compound are arranged along the height of the densified polymer bed of the downcomer 9. Polypropylene is continuously discharged from the bottom of the downcomer via line 21 with a flow rate of 22 t/h (reactor productivity).

The total amount of EDENOL D81® fed to the downcomer 9 by means of the above feed lines F1 is equal to 0.7 kg/h, which is equivalent to about 32 ppm weight based on the weight of polypropylene discharged from the reactor.

A second line F2 for dosing 0.2 Kg/h of EDENOL D81® is arranged on line 7 feeding the prepolymer to the riser 8 (as shown in FIG. 1).

A third line F3 for dosing 1.7 Kg/h of EDENOL D81® is arranged along the gas recycle line 15 upstream the compressor 16 (as shown in FIG. 1).

Accordingly, the total amount of EDENOL D81® introduced in the polymerization reactor is of 2.6 Kg/h, equivalent to about 118 ppm weight based on the weight of polypropylene discharged from the downcomer 9.

The obtained polypropylene has a melt Index MIL of 10 (g/10 min) and an ethylene content of 3.0 wt %.

Also in this polymerization run a continuous discharge of polypropylene from the reactor is observed and any formation of polymer lumps in the gas-phase reactor is prevented. A high level of incorporation of EDENOL D81® on the densified polymer avoids the formation of polymer chunks along the entire downcomer.

Example 4

Comparative

The polymerization of propylene was repeated according to the same operating conditions of Example 1.

ATMER163® is likewise used as the antistatic agent as in Example 1, with the difference that said antistatic agent is fed into the downcomer 9 by means of only two feed lines F1, the other feed lines F1 being kept completely closed. This process arrangement does not satisfy the equation $N \geq (1+0.08 \cdot H)$, where H=22.5 m.

The total amount of ATMER163 fed to the downcomer 9 by means of the above two feed lines F1 is equal to 1.0 kg/h, which is equivalent to 50 ppm weight based on the weight of reactor productivity (as in Example 1).

A second line F2 for dosing 0.13 Kg/h of ATMER163 is arranged on line 7 feeding the prepolymer to the riser 8.

A third line F3 for dosing 0.45 Kg/h of ATMER163 is arranged along the gas recycle line 15 upstream the compressor 16.

Accordingly, the total amount of ATMER163 introduced in the polymerization reactor is of 1.58 Kg/h, equivalent to 79 ppm weight based on the weight of reactor productivity (as in Example 1).

After a time of 20 hours the discharge of polypropylene from the reactor via line 21 is interrupted due the formation of polymer lumps inside the bottom part of the downcomer 9: said polymer lumps hinder the regular flow of polymer particles along the downcomer 9, till to cause a complete clogging of the polymerization reactor.

This comparative example proves that, when feeding an antistatic agent to a densified polymer bed by a number of feed lines lower than $N \geq (1+0.08 \cdot H)$, a poor level of incorporation of the antifouling agent on the densified polymer is achieved, with consequent formation of polymer chunks inside the downcomer.

Example 5

A propylene/ethylene copolymer is prepared by polymerizing propylene and ethylene in the presence of hydrogen as a molecular weight regulator and propane as an inert diluent.

In the riser and downcomer the same operative conditions of temperature, pressure, molar composition of Example 2 are selected.

About 1000 ton/h of a gaseous stream containing propylene, ethylene, propane and hydrogen flows upwards along the riser 8, where fast fluidization conditions are established. The polymer is mostly separated from the gas by the gas/solid separator 14. About 44 ton/h of gas are entrapped with the descending flow of polymer in the downcomer 9 while a gas stream in an amount of about 956 ton/h is conveyed to the recycle line 15.

The density of solid (Kg of polymer per $m^3$ of reactor occupied by the polymer) inside the downcomer 9 is measured in order to evaluate if the polymer particles flow downward in a "densified" form along the downcomer 9: the measurement gives a value of about 420 Kg/$m^3$. The poured bulk density of the obtained copolymer is measured giving a value of 450 Kg/$m^3$.

The ethylene/propylene copolymer is continuously discharged from the bottom of the downcomer via line 21 with a flow rate of 22 t/h (reactor productivity).

EDENOL D81® is used as antistatic agent in this example. Four feed lines F1 for feeding said antistatic compound are arranged along the height of the densified polymer bed.

The total amount of EDENOL D81® fed to the downcomer 9 by means of the above feed lines F1 is equal to 2.6 kg/h, which is equivalent to 118 ppm weight based on the weight of copolymer discharged from the reactor.

A second line F2 for dosing 0.21 Kg/h of EDENOL D81® is arranged on line 7 feeding the prepolymer to the riser 8 (as shown in FIG. 1).

A third line F3 for dosing 0.30 Kg/h of EDENOL D81® is arranged along the gas recycle line 15 upstream the compressor 16 (as shown in FIG. 1).

Accordingly, the total amount of EDENOL D81® introduced in the polymerization reactor is of 3.11 Kg/h, equivalent to about 141 ppm weight based on the weight of copolymer discharged from the downcomer 9.

The obtained copolymer has a melt Index MIL of 10.0 (g/10 min) and an ethylene content of 3.0 wt %.

Also in this polymerization run a continuous discharge of copolymer from the reactor is observed and any formation of polymer lumps in the downcomer is prevented. In particular, a high level of incorporation of antistatic agent on the densified polymer is achieved, thus avoiding formation of polymer chunks along the entire downcomer 9.

The invention claimed is:

1. A process for the gas-phase polymerization of at least one alpha-olefin in the presence of a polymerization catalyst, the process comprising:
   polymerizing in at least a polymerization step wherein polymer particles flow downward in densified form under the action of gravity so as to form a densified polymer bed, and
   metering an anti-fouling agent in said polymerization step by means of at least N feeding lines placed at different heights of said densified polymer bed, N being the integer number satisfying the equation $N \geq (1+0.08 \cdot H)$, where H is the height (expressed in meters) of the polymer bed.

2. The process according to claim 1, wherein said integer number N satisfies the equation $N \geq (1+0.1 \cdot H)$.

3. The process according to claim 1, wherein said antifouling agent is metered in an amount ranging from 5 to 250 ppm weight based on the weight of polyolefin being produced.

4. The process according to claim 1, wherein the gas-phase polymerization of at least one alpha-olefin is performed in a gas-phase reactor having two interconnected polymerization zones, the first polymerization zone, denominated the riser, comprising polymer particles flowing upward under fast fluidization or transport conditions, the second polymerization zone, denominated the downcomer, comprising polymer particles flowing downward in densified form under the action of gravity so as to form said densified polymer bed.

5. The process according to claim 4, wherein said anti-fouling agent is metered in said gas-phase reactor having two interconnected polymerization zones by means of three separate feeds comprising
   a first feed F1 distributed along the height of said downcomer by means of at least N feeding lines, N being an integer number satisfying said equation $N \geq (1+0.08 \cdot H)$;
   a second feed line F2 arranged on the line feeding the prepolymer to said riser; and
   a third feed line F3 arranged along a gas recycle line.

6. The process according to claim 5, wherein said antifouling agent is added to said gas phase reactor in a total amount ranging from 20 to 500 ppm weight, based on the weight of polyolefin being produced.

7. The process according to claim 5, wherein said first feed $F_1$ comprises from 30 to 60% by weight of the total amount of said anti-fouling agent, the second feed $F_2$ comprises from 5 to 20% by weight of the total amount of said anti-fouling agent, and the third feed $F_3$ comprises from 30 to 60% by weight of the total amount of said anti-fouling agent.

8. The process according to claim 1, wherein said antifouling agent is selected from:
   (1) alkyldiethanolammines of formula R—N(CH$_2$CH$_2$OH)$_2$ wherein R is an alkyl radical comprised between 10 and 20 carbon atoms;
   (2) Polyepoxidate oils selected from epoxidate linseed oil or epoxidate soya oil;
   (3) Polyalcohols having from 4 to 8 carbon atoms;
   (4) Hydroxyesters with at least two free hydroxyl groups, obtained from carboxylic acids with from 8 to 22 carbon atoms and from polyalcohols;
   (5) Amides of formula R—CONR'R", wherein R, R', and R" may be the same or different and is a saturated or unsaturated hydrocarbon radical having 1 to 22 carbon atoms;
   (6) Fatty acid soaps represented by the general formula R—COOM, wherein R is a saturated or unsaturated hydrocarbon radical having 12 to 22 carbon atoms, and M is an alkali or alkaline earth metal;
   (7) Salts of sulfuric acid esters of higher alcohols represented by the general formula ROSO$_3$M, wherein R is a saturated or unsaturated hydrocarbon radical having 12 to 22 carbon atoms, and M is an alkali or alkaline earth metal;
   (8) Salts of sulfuric acid esters of higher secondary alcohols represented by the general formula

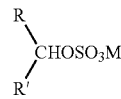

wherein R and R' may be the same or different and are selected from saturated or unsaturated hydrocarbon radical having 12 to 22 carbon atoms, M is an alkali or alkaline earth metal;
   (11) Salts of alkylarylsulfonic acids;
   (12) Alkali or alkaline earth metal salts of dialkylsulfosuccinic acids;
   (13) Alkali or alkaline earth metal salts of partial esters of higher alcohols with phosphoric acid;
   (14) Salts of primary amines represented by the general formula

wherein R is a saturated or unsaturated hydrocarbon radical; A is chlorine or bromine;
   (16) Compounds represented by the general formula

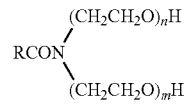

wherein R is a saturated or unsaturated hydrocarbon radical having 4 to 22 carbon atoms; n and m, which may be the same or different, are numbers of from 1 to 10; or
   (17) mixtures thereof.

9. The process according to claim 8, wherein said antifouling agent is selected from the group consisting of classes (1), (2), (3), (4) and (5).

10. The process according to claim 9, wherein said antifouling agent is selected from alkyldiethanolammines of formula R—N(CH$_2$CH$_2$OH)$_2$, where R is an alkyl radical C$_{12}$-C$_{18}$; epoxidate linseed oils; epoxidate soya oils; or glycerol monostearate.

11. The process of claim 8 wherein the anti-fouling agent is selected from:
   (1) alkyldiethanolammines of formula R—N(CH$_2$CH$_2$OH)$_2$ wherein R is an alkyl radical comprised between 12 and 18 carbon atoms.

* * * * *